F. H. CRAGO.
CURRENT MOTOR.
APPLICATION FILED DEC. 22, 1908.
951,525.
Patented Mar. 8, 1910.
3 SHEETS—SHEET 1.
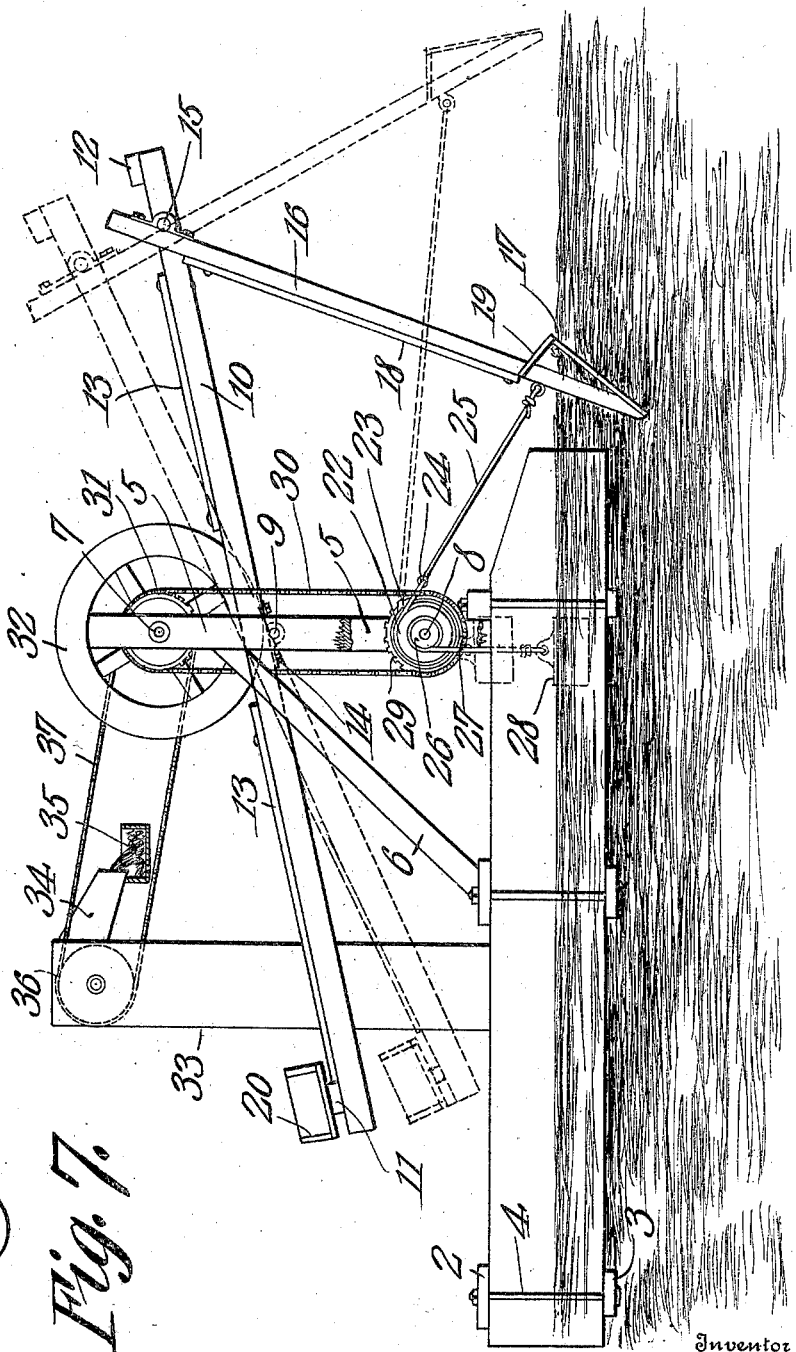
Inventor
Felix H. Crago.
By C. A. Snow & Co.
Attorneys
Witnesses

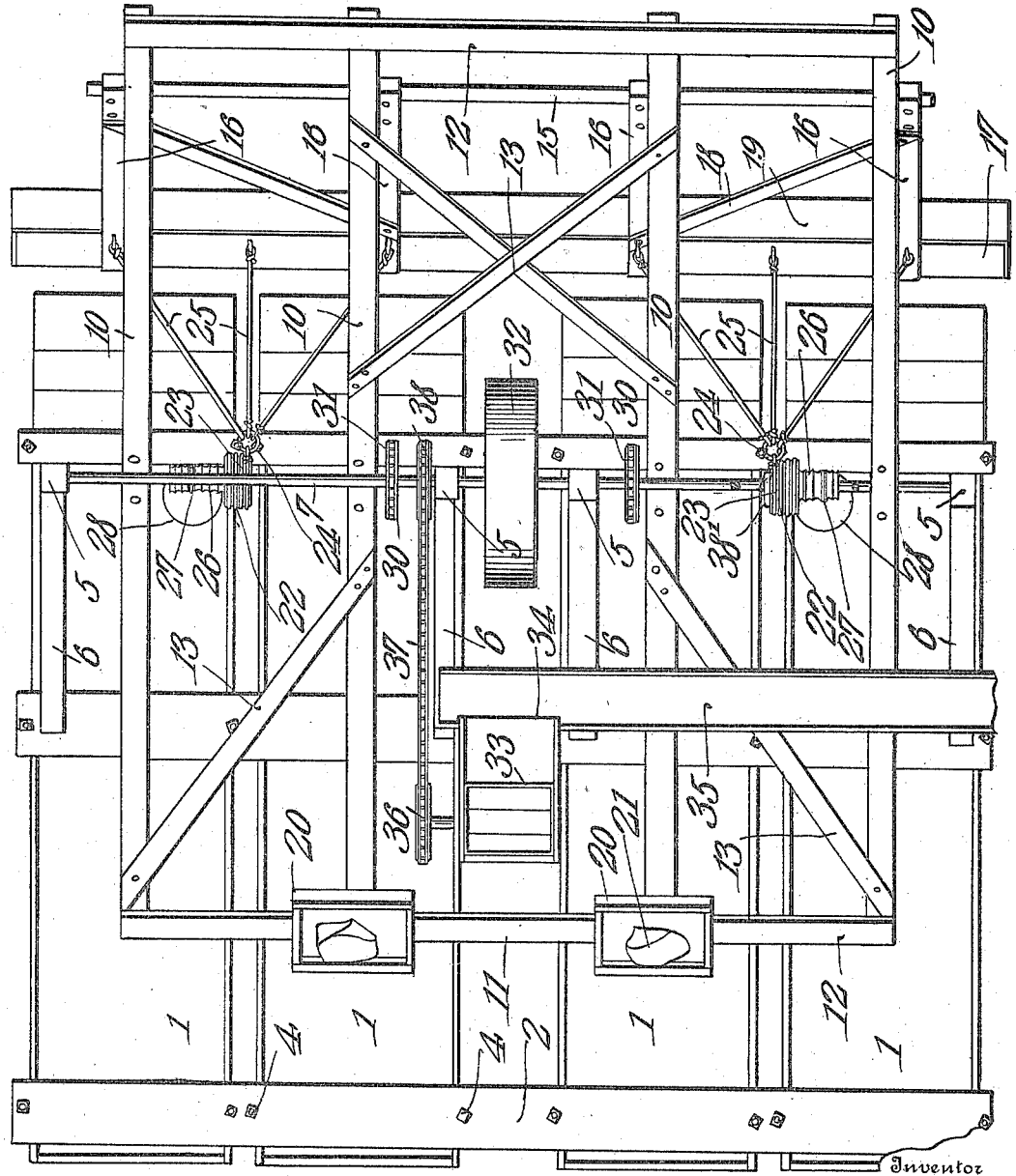

F. H. CRAGO.
CURRENT MOTOR.
APPLICATION FILED DEC. 22, 1908.
951,525.
Patented Mar. 8, 1910.
3 SHEETS—SHEET 3.
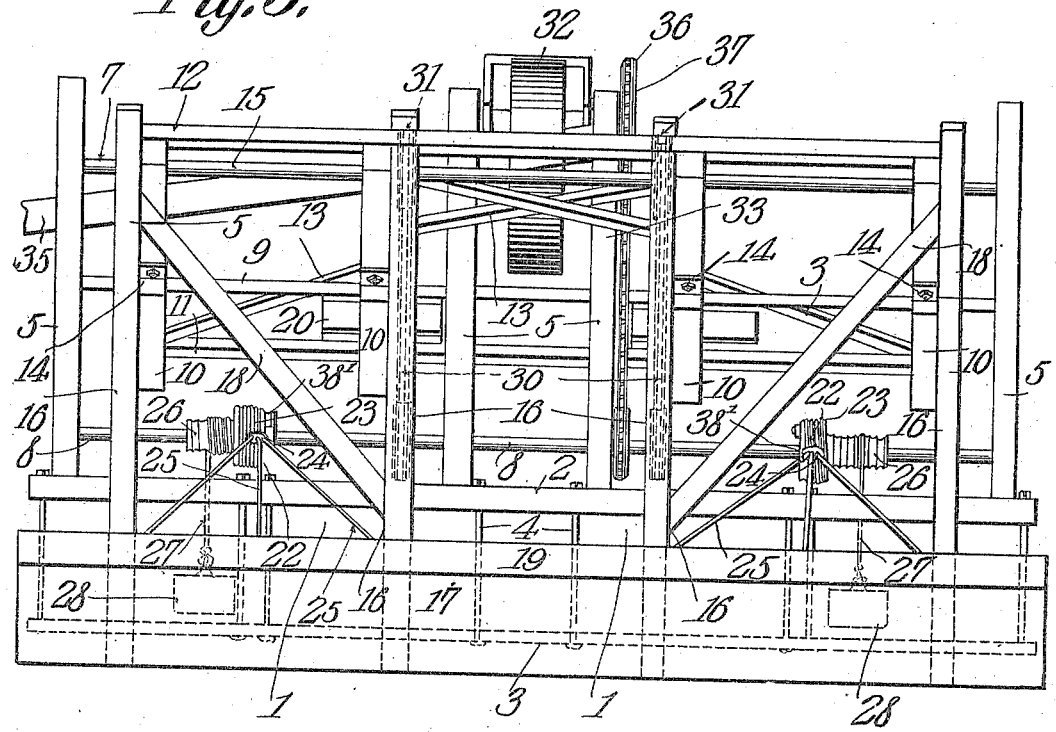
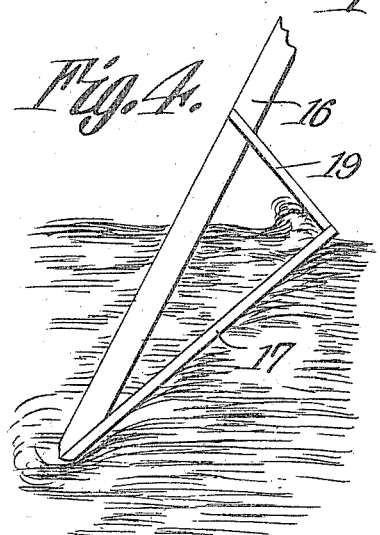
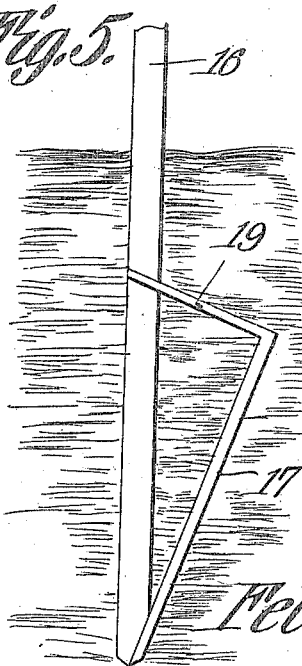
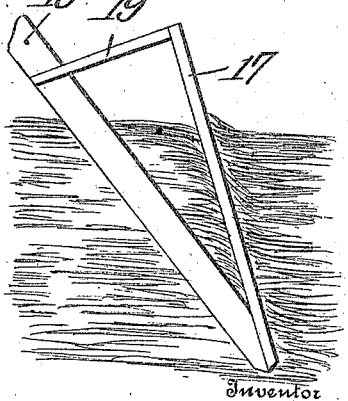
Witnesses
Inventor
Felix H. Crago
By C. A. Snow & Co.
Attorneys

UNITED STATES PATENT OFFICE.

FELIX H. CRAGO, OF TOWNSEND, MONTANA.

CURRENT-MOTOR.

951,525.  Specification of Letters Patent.  Patented Mar. 8, 1910.

Application filed December 22, 1908. Serial No. 468,779.

*To all whom it may concern:*

Be it known that I, FELIX H. CRAGO, a citizen of the United States, residing at Townsend, in the county of Broadwater and State of Montana, have invented a new and useful Current-Motor, of which the following is a specification.

This invention has reference to improvements in current motors and is designed more especially for the utilization of flowing water for generating motive power for any purpose although the special structure in which the present invention is embodied is designed for a purpose of elevating water for irrigating purposes.

The present invention comprises a floating structure designed to rest on the surface of a flowing stream of water and to be anchored or otherwise held against participation in the flowing movement of the water.

Carried by the floating structure is a water elevating device, which however is to be taken as illustrative of any power utilizing device and to operate the water elevating device there is provided a current impelled structure movable by and with the flowing stream of water for a limited distance and then automatically returning to the starting point to be again engaged by the water stream and again impelled for the limited distance and again returning to the starting point, the cycle of operation being continuous so long as it is desired to utilize the power of the flowing stream. Since the action of the flowing stream upon the device impelled thereby is intermittent, the invention contemplates the use of a power storing means of the inertia type which may consist of or be similar to an ordinary fly wheel, the connections between the current impelled device and the said fly wheel being such as to cause the rotation of the latter always in the same direction.

The invention will be best understood from a consideration of the following detail description taken in connection with the accompanying drawings forming a part of this specification, with the understanding however that the showing of the drawing is not to be taken as the only embodiment of the invention since the said invention is capable of a great variety of forms and is not limited to the exact structure shown.

In the drawings, Figure 1 is a side elevation of the structure with parts shown in section and different phases of the operation being illustrated in solid and broken lines. Fig. 2 is a plan view. Fig. 3 is an end elevation from the down stream end. Figs. 4, 5 and 6 are schematic views showing phases of the operation. Fig. 7 is a detail view of a pawl and ratchet mechanism used in connection with the structure.

Referring to the drawings, there is shown a series of floats or scows 1 joined top and bottom by cross pieces 2 and 3 connected by bolts 4 at suitable intervals. While four scows arranged in two pairs are shown in the drawings with a greater space between the pairs than between the individual members of pairs of scows, it is to be understood that a greater or lesser number of scows may be used and under some circumstances a single scow may be employed. It will be understood that these scows are to be anchored or otherwise secured in the stream of water in such manner that the water will flow lengthwise of the scows and between the same in the spaces separating them.

Near the down-stream end of the scows are erected a number of posts 5 supported by suitable braces 6. Extending transversely of the scows and journaled in the posts 5 near the top and bottom thereof are two shafts 7 and 8. Between the shafts 7 and 8 the posts 5 support another shaft or rod 9 which may be fixed in the posts or may be journaled therein. The shaft 9 serves as a pivot support for a frame composed of timbers 10 extending longitudinally of the floats and other end cross timbers 11—12 and this frame is strengthened and stiffened by suitable cross braces 12—13 which may be of any character and number desired or necessary and which are simply illustratively shown in the drawings. The frame timbers 10 are connected to the shaft 9 by suitable yokes or journal bearings 14 which may either be secured to the shaft 9 when the latter is rockable or may turn on the said shaft when the latter is fixed. Extending across the frame supported on the shaft 9 is a rod 15 near the down-stream end of said frame and this rod serves as a support for a number of pendent timbers 16 carrying at their lower ends a blade or paddle 17 extending entirely across the width of the structure. Suitable braces 18 may be employed if desirable to strengthen this frame. The lower edge of the blade 17 is made fast to the lower ends of the timbers 16 and this blade then diverges from the timbers in the downstream direction and the upper edge of the blade is connected to the timbers by an overhang member 19. The frame made up of the timbers 10, 11 and 12 is capable of rocking upon the shaft 9 in a manner to be described. The up-stream end of the rocking frame carries on the timber 11 a suitable number of weights which in the present instance are shown as boxes or receptacles 20 in which masses of rock or other suitable material 21 is located. Of course these receptacles 20 with the weights 21 therein may be replaced by suitable blocks of metal answering the same purpose. The weights 21 are so proportioned as to underbalance the rocking frame with the pendent blade 17 which latter at all times over-hanging the water when in the elevated position tends constantly to move toward the water. The purpose of this will presently appear.

The shaft 8 carries one or more winding drums 22, two being shown in the drawings. Each winding drum receives a rope or cable 23 connected to a ring 24 from which are other divergent cables or strands 25 coupled at separated points to the blade 17 or the timbers 16 as the case may be. Of course if so desired the strands 25 may be replaced by metal rods. In small structures the cable 23 may be directly connected to the blade 17 or a corresponding timber 16 but in the larger structures it is advisable to separate the strands or connecting rods so as to give a wide connecting surface at separated points to the blade 17 to properly distribute the strain. Upon the drums 22 or in the particular instance shown in the drawings upon a side extension 26 thereof of smaller diameter there is wound a strand 27 carrying at its outer end a suitable weight 28. In the particular structure shown the two weights 28 are sufficient to draw the blade 17 toward the float when the said blade is in the air above the water. The direction of winding of the strand or cable 23 upon the drum 22 is opposite that of the direction of winding of the strand or cable 27 so that the blade 17 and weights 28 act in opposition. The shaft 8 also carries sprocket wheels 29, two being shown in the drawings at separated points and these sprocket wheels are connected by sprocket chains 30 to other sprocket wheels 31 mounted on the shaft 7 at appropriate points. The shaft 7 also carries a fly or balance wheel 32 at an intermediate point, but it will be understood that two or more balance wheels may be used if so desired.

At an appropriate point say near the upstream end of the scows and between the pairs thereof there is mounted a water elevating structure 33 which may be of any suitable known form, and therefore it is not deemed necessary to either show or describe any particular type of water elevator. This elevator discharges by a suitable spout 34 into a trough 35 by means of which the water is conveyed to a point of utilization. The water elevator is provided with a sprocket wheel 36 connected by a sprocket chain 37 to another sprocket wheel 38 upon the shaft 7.

The winding drums 22 are not made fast upon the shaft 8 but are connected thereto by an ordinary pawl and ratchet mechanism 38′ so that the shaft 8 is turned with the drums 22 when said drums are rotated in one direction only and the shaft does not participate in the rotation of the drums when they are rotated in the opposite direction.

Since the blade or paddle 17 and the parts carrying the same over-balance the weights 21 so that the constant tendency of the blade is to move toward the water when elevated above the same, let it be assumed that the blade is entering the water as shown in Fig. 4 when the blade is close to the down-stream end of the scows or floats. Under these conditions the flowing water will strike the blade at an angle tending to force the blade into the water against the action of the weights which when the blade is in the water and its weight therefore neutralized will tend to lift the blade. At the same time the flowing water will force the blade down stream about its pivot support on the shaft 15 and at the same time the blade will be forced deeper and deeper into the water by the reaction of the latter on the sloping face of the blade. While the blade is moving down stream it is acting upon the drums 22 through the strands 25 and 23 and the said drums are being turned on their axes by the movement of the blade away from the corresponding end of the float. The pawl and ratchet structure is so arranged that during this movement it is in engagement with the shaft 8 and the latter participates in the rotative movement of the drums. Also the weights 28 are being elevated by the winding of the cables or strands 27 on the drum extensions 26. The rotative movement of the shaft 8 is imparted to the shaft 7 through the chain and sprocket connections therewith and the sprocket wheel 32 participates in this rotative movement. The blade 17 continues down stream moving about the longitudinal axis of the shaft 15 until ultimately the inclination of the blade is such that the reaction of the water thereon tends to lift the blade toward the surface of the stream. Now the over-balancing of the weights 21 together with the upward lifting of the blade due to the reaction of the water in a direction tending to elevate said blade act together and the blade is forcibly ejected from the water with considerable speed so that it is lifted clear of the surface of the water and then the weights 28 immediately act to draw the blade toward the float or scow thus reversing the direction of rotation of the drums 22 and winding the ropes or strands 23 thereon, the weights 28 dropping toward the bottoms of the scows. Before the upward movement of the float has been entirely neutralized and the weight of the said blade begins to act the blade has been brought up close to the down stream end of the scows so that when the blade again enters the water it has become inclined in the proper direction to receive the impact of the water at an angle tending to force the blade into the water against the counterbalancing action of the weights 21 as the weight of the blade is neutralized by the floating action of the water. The blade is thus forced down stream by the action of the flowing water and rotative movement is thereby imparted to the shaft 7 carrying the fly wheel 32 and then the blade is thrown out of the water to be returned by the weights 28 to its initial position to again enter the water and the cycle of operations is repeated indefinitely or as long as the machine is maintained in operation. The power stroke of the blade depends upon the speed of the stream of water and the retarding action of the load placed upon said blade while the return stroke wherein the blade is relieved from work may be comparatively rapid.

Since the fly wheel 32 tends to store up the power generated on the active stroke of the blade it will carry the shaft 7 over the time occupied by the inactive stroke of the blade. Thus the machine is enabled to furnish power evenly and steadily although the application of power to the blade 17 be intermittent.

Although the operation of the blade 17 be intermittent the action of the entire machine is entirely automatic and no shifting or other like mechanism is required, since the water stream itself serves to cause the movement of the blade to the return position so that the weights which were elevated on the power stroke may act to carry the blade to its initial position.

It will be observed that the over-hang 19 prevents the water from over-flowing the upper edge of the blade 17 but does not interfere to any material extent with the lifting action of the water when the blade is inclined up stream, that is with its upper edge up stream.

What is claimed is:—

1. In a current motor, an oscillatory power blade and a support for the same movable to and from the stream surface, the said power blade having a plane active face at an angle to the support and diverging therefrom in the direction of the power stroke and provided with an overhang at the upper edge.

2. In a current motor, a pendent support, and a power blade having a plane active face diverging upwardly from the said pendent support in the direction of the power stroke, and a power blade having an overhang at the upper edge directed toward the support.

3. In a current motor, a support, and a power blade having a plane active face diverging upwardly from said support at an acute angle in the direction of the power stroke, and an over-hang connecting the upper end of the power blade with the support.

4. In a current motor, a pendent support, a power blade diverging upwardly from said pendent support in a down stream direction, a rockable frame carrying the pendent support and under-balanced with reference to the power blade when the latter is out of the water, a rotatable shaft, inertia means for regulating the rotation of said shaft, a winding drum on the shaft, connections between the blade and drum, a one-way coupling means between the drum and shaft, a weight acting on the winding drum in opposition to the blade, and power utilizing means connected to the shaft.

5. In a current motor, a suitable float, a pendent support, a power blade diverging upwardly from said pendent support in a down stream direction, and having an overhang at the upper edge directed up stream, a rockable frame carrying the pendent support and under-balanced with reference to the power blade when the latter is out of the water, said rockable frame being mounted on the float, a rotatable shaft, inertia means for regulating the rotation of said shaft, a winding drum on the shaft, connections between the blade and drum, a one-way coupling means between the drum and shaft, a weight acting on the winding drum in opposition to the blade, and power utilizing means connected to the shaft.

6. In a current motor, a suitable float, a water elevator carried thereby, and means on the float for operating the water elevator comprising a rockable frame, a pendent support carried by the frame, a blade on the support diverging therefrom in a down stream direction, a rotatable shaft, an inertia controlling means actuated by the shaft, connections between the shaft and the water elevator, a winding drum on the shaft, connections between the winding drum and the blade, one-way coupling means between the drum and the shaft, and weights acting on the drum in opposition to the blade.

In testimony that I claim the foregoing as my own, I have hereto affixed my signature in the presence of two witnesses.

FELIX H. CRAGO.

Witnesses:
J. P. KEARNS,
J. C. HAMILTON.